(12) United States Patent  (10) Patent No.: US 8,474,738 B2
Virtanen  (45) Date of Patent: Jul. 2, 2013

(54) IMPACT MILL

(75) Inventor: Pentti Virtanen, Porvoo (FI)

(73) Assignee: Fractivator Oy, Tampere (FI)

( * ) Notice: Subject to any disclaimer, the term of this patent is extended or adjusted under 35 U.S.C. 154(b) by 1420 days.

(21) Appl. No.: 11/919,664

(22) PCT Filed: May 15, 2006

(86) PCT No.: PCT/FI2006/000156
§ 371 (c)(1),
(2), (4) Date: Oct. 31, 2007

(87) PCT Pub. No.: WO2006/123010
PCT Pub. Date: Nov. 23, 2006

(65) Prior Publication Data
US 2011/0168821 A1  Jul. 14, 2011

(30) Foreign Application Priority Data
May 20, 2005  (FI) ..................................... 20050538

(51) Int. Cl.
*B02C 13/20* (2006.01)
*B02C 13/09* (2006.01)
(52) U.S. Cl.
USPC ........................................ 241/187; 241/188.2
(58) Field of Classification Search
USPC .................... 241/187, 188.1, 188.2
See application file for complete search history.

(56) References Cited

U.S. PATENT DOCUMENTS

| 225,552 | A | * | 3/1880 | Bennett | 241/187 |
|---|---|---|---|---|---|
| 969,120 | A | | 8/1910 | Shapleigh | |
| 2,155,150 | A | * | 4/1939 | Schacht | 241/80 |
| 2,216,013 | A | | 9/1940 | Kenney | |
| 2,637,359 | A | * | 5/1953 | Taylor | 241/85 |
| 3,487,094 | A | * | 12/1969 | Trautman et al. | 554/23 |
| 3,497,144 | A | * | 2/1970 | Iohannes | 241/187 |
| 4,403,868 | A | | 9/1983 | Kupka | 366/295 |
| 4,659,025 | A | * | 4/1987 | Tjumanok et al. | 241/187 |
| 5,724,867 | A | | 3/1998 | Jordan | 74/665 |
| 7,028,931 | B2 | * | 4/2006 | Lin et al. | 241/79.1 |
| 2004/0184837 | A1 | | 9/2004 | Kinouchi | 399/227 |

FOREIGN PATENT DOCUMENTS

| DE | 10314804 | 10/2004 |
|---|---|---|
| GB | 254130 | 7/1926 |
| GB | 378841 | 8/1932 |

* cited by examiner

*Primary Examiner* — Faye Francis
(74) *Attorney, Agent, or Firm* — James C. Lydon

(57) ABSTRACT

An impact mill equipped with transmission machinery (10) to rotate two coaxial rotors (16, 18) of a rotor apparatus (12) by one single driving apparatus (14). The transmission device includes, according to one alternative, a secondary shaft (32; 36*b*) equipped with a gear pair (28, 30) or a conic gear (29). The first gear (28) rotates a gear (24) at the shaft (20) of the first rotor (16), and the second gear (30) rotates a gear (26) at the shaft (22) of the second rotor (18), but in the opposite direction or at a different speed. The conic gear (29) rotates the gear (24*a*) at the shaft (20) of the first rotor (16) in one direction, and the gear (26*a*) at the shaft (22) of the second rotor (18) in the opposite direction.

4 Claims, 5 Drawing Sheets

IMPACT MILL

The present invention relates to an impact mill equipped with transmission machinery according to the preamble of the independent claim presented later in this patent application. This transmission machinery can be used to rotate a rotor apparatus comprising two coaxial rotors by using a driving apparatus. Rotor apparatuses equipped with coaxial rotors are used for example in grinders and mixers operating according to the impact mill-principle. As driving apparatus or power source is generally used electric motors.

BACKGROUND OF THE INVENTION

In order to rotate the coaxial rotors in different or the same direction of rotation, earlier has normally been used two separate electrical motors. The first electrical motor rotates, typically using vee belt driving, the shaft of the first rotor in one direction of rotation. The second electrical motor rotates accordingly, typically using vee belt driving, the shaft of the second rotor in the opposite or the same direction of rotation.

The rotors are typically arranged within each other so that the separate rings of the rotors are allowed to freely rotate with respect to each other. The shaft assembly used to rotate the rotors is constructed so that inside a so called vertical pipe is beared the transmission apparatus for the so called upper rotor. Said transmission apparatus is rotated with a first lower motor. Outside said vertical pipe is beared the transmission apparatus necessary for rotating the so called lower rotor, wherein said transmission apparatus is rotated with a second upper motor. The material to be fed into the apparatus comprising the rotors can be fed from above the upper rotor, or alternatively, through the shaft driving the upper rotor, wherein the feeding is made from below.

The transmission arrangement described above requires relatively much space around the rotor apparatus. Particularly the use of two separate electrical motors requires a lot of space. Also it may be difficult to arrange the transmission from the electrical motor to a rotor into the centre of which material to be treated is intended to be fed through the shaft of said rotor.

Thus, the object of the present invention is to provide a new and improved impact mill, which is equipped with transmission machinery suitable for use in rotating two coaxial rotors in different directions or in the same direction with different speed.

Especially, the object is to provide a transmission machinery arrangement by use of which the aforementioned disadvantages are minimized or totally eliminated.

Thus, the object is for example to provide a transmission machinery arrangement which can be fitted in a smaller space than before.

Another object is to provide a more service friendly transmission machinery arrangement.

BRIEF SUMMARY OF THE INVENTION

The invention concerns an impact mill equipped with a driving apparatus and a rotor apparatus, where the rotor apparatus comprises two coaxial rotors with shafts. The first rotor is equipped with blades having impact surfaces and which blades form one or more, typically at least two rings coaxial with said rotor. The second rotor is also equipped with blades having impact surfaces and which blades form one or more, typically at least two rings coaxial with said rotor. The rings of the first and second rotor are arranged in an intermeshed fashion. The invention is characterized in that the impact mill further comprises transmission machinery, which is arranged to distribute the rotating motion generated by the driving apparatus to the shafts of both of the rotors to in order to rotate the same.

DETAILED DESCRIPTION OF THE PREFERRED EMBODIMENTS

The transmission machinery described in this invention is intended for use to rotate two coaxial rotors or other corresponding elements of a rotor apparatus by means of a driving apparatus, typically an electrical motor. Also other driving apparatuses can be used, for example driving apparatuses using fuel oil, diesel, or gas, or other driving apparatuses, for example used in agriculture.

Typically, the transmission machinery comprises a secondary shaft equipped with a gear pair, which is driven by the driving apparatus directly or by means of a transmission apparatus. The first gear of the gear pair at the secondary shaft is arranged to rotate, directly or by means of a transmission wheel, a gear to be driven, where said gear is at the shaft of the first rotor of a rotor apparatus, by a first speed in a first direction of rotation. The second gear of the gear pair at the secondary shaft is arranged to rotate, directly or by means of a transmission wheel, a gear to be driven, where said gear is located at the shaft of the second rotor of the rotor apparatus, in the opposite direction of rotation or by a second speed in the same direction of rotation. The gears to be driven thus rotate the shafts of the rotors and thus the rotors themselves. The gears of the gear pair at the secondary shaft are typically spur gears, as also the gears of the rotors.

According to another embodiment, the secondary shaft of the transmission machinery may have one conical gear instead of two separate gears. By this conical gear two conical gears can be rotated simultaneously, the firs one in a first direction of rotation and the second on in a second direction of rotation. By means of the conical gear at the secondary shaft the gears, in this case conical gears, at the shafts of both of the rotors can be rotated.

In certain cases even the driving shaft of the driving apparatus can operate as the aforementioned secondary shaft.

In other forms of application the secondary shaft can be fitted between the driving shaft of the driving apparatus and the shafts of the rotors so that the driving wheel at the driving shaft of the driving apparatus rotates the first gear at the secondary shaft and simultaneously the secondary shaft itself and the second gear thereon.

On the other hand in certain applications it may be necessary to arrange the driving apparatus slightly farther from the shafts of the rotors. In that case the transmission machinery between the driving apparatus and the shafts of the rotors may, in addition to the aforementioned components, additionally comprise a transmission shaft equipped with a transmission wheel. The transmission shaft with the transmission wheel is arranged to transmit the rotating motion of the driving shaft of the driving apparatus to the secondary shaft and the gear pair thereon. In that case the driving wheel at the driving shaft of the driving apparatus rotates the transmission wheel at the transmission shaft. The transmission wheel at the transmission shaft rotates in turn the first gear at the secondary shaft.

In the transmission machinery, the gears, driving wheels, transmission wheels and wheels to be driven are typically spur gears, conical gears or other analogous rotating elements transmitting the rotating motion.

In the transmission machinery, the driving wheel at the driving shaft of the driving apparatus, the first gear at the secondary shaft and the first gear to be driven at the shaft of the first rotor are typically arranged on a same first level. Accordingly, the second gear at the secondary shaft and the second gear to be driven at the shaft of the second rotor are typically arranged on a same second level. If the motion from the secondary shaft to the rotor shaft is transmitted by a transmission wheel, also the transmission wheel is arranged on the same level as the wheel to be driven.

If desired, the rotation motion of the driving wheel of the driving apparatus can alternatively be transmitted to the secondary shaft by means of a belt transmission apparatus. The gear pair at the secondary shaft is also in that case arranged to rotate the wheels to be driven at the rotor shafts in different direction of rotation or in the same direction with different speed.

The transmission machinery described herein is particularly useful for transmitting the driving power from, for example, an electrical motor to a rotor apparatus having two coaxial rotors rotating in different direction. Such rotor apparatuses are used for example in grinders and mixers operating according to the impact mill principle, which have been disclosed earlier in the Finnish patent publications FI 94030 B, FI 105112 B and FI 105699 B and the PCT-publication WO 96/18454.

In the impact mill, the first rotor and the second rotor are typically equipped with blades, pins or corresponding elements having impact surfaces. These elements are arranged on the two rotors so that they on each rotor form one ore more, typically at least two rings which are coaxial with respect to said rotor. The rings of the rotors are arranged in an intermeshed fashion with respect to each other. One rotor may, if desired, be a stator.

The rotor apparatus is enveloped by a housing, into which has been formed a feeding opening through which material to be treated can be fed to the centre of the rotors. The rotors cause the material to move from the centre through the rings formed by the blades in a zigzag track to the outermost ring. At the same time the blades throw impacts and counter-impacts to the material to be treated, so that the material can be treated, for example ground, in a desired manner. The material moves off from the outermost ring through a discharge opening in the housing.

The invention can be used in the most different apparatuses employing the impact mill principle, wherein the rotors are used as grinders, crushers, mixers, dispergators, pulpers, fragmentators, activators, or the like. The invention can on the other hand also be used in apparatuses where rotors are used to mix various additives, such as chemicals, into solids or mixtures of solids. The invention can also be used in other applications where rotors are used to bring different substances into contact with each other.

BRIEF DESCRIPTION OF THE DRAWINGS

The present invention is described more in detail by reference to the drawings, which are shown only as examples, and where

FIG. 1 shows as a vertical cross section the transmission machinery 10 arranged between the rotor apparatus 12, which operates according to the impact mill principle, and the electrical motor 14 used as driving apparatus.

The rotor apparatus 12, which operates by use of the impact mill principle, comprises two coaxial, in opposite directions rotating rotors, a first rotor 16 and a second rotor 18. The rotors are in this exemplified case arranged on a horizontal level so that the rotors rotate in the horizontal level and the shafts 20, 22 of the rotors are vertical.

Figure 1:
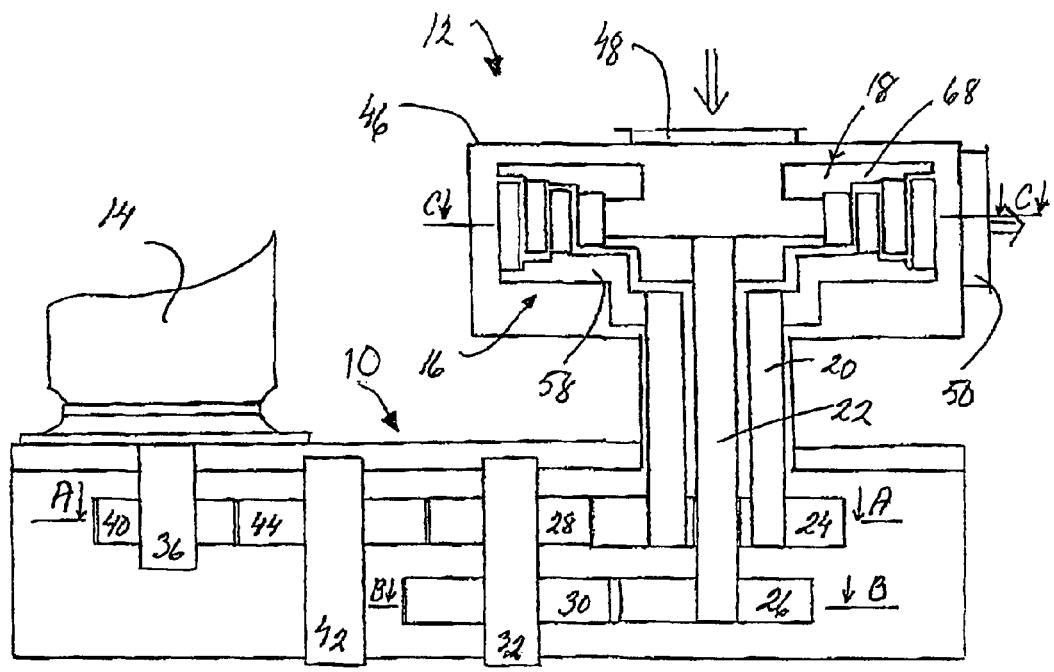
FIG. 1 shows schematically and simplified a vertical cross section of the transmission machinery between the driving apparatus and the rotor apparatus.

In the case illustrated by FIG. 1, the shaft 22 of the second rotor is arranged inside the shaft 20 of the first rotor. At the lower end of the rotor shafts the wheels to be driven have been arranged, i.e. a first gear 24 to be driven at the lower end of the first shaft 20 and a second gear 26 to be driven at the lower end of the second shaft 22. By rotating said gears 24, 26 the shafts 20, 22 and the rotors 16, 18 in the opposite end of the shafts can be rotated independently of each other in different directions or with different speeds.

The transmission machinery 10, which enables the two coaxial rotors 16, 18 of the rotor apparatus 12 to be rotated in different directions by an electrical motor 14 or a corresponding driving apparatus, comprise a first secondary shaft 32, equipped with a gear pair 28, 30. The first gear 28 of the gear pair is arranged to drive a first gear 24 to be driven, located at the end of the shaft 20 of the first rotor 16. The arrangement can be seen in FIG. 2. The second gear 30 of the gear pair is in turn arranged to drive the second gear 26 to be driven, located at the end of the shaft 22 of the second rotor 18 by means of a transmission wheel 34, as can be seen in FIG. 3. When the first gear 24 to be driven is driven directly and the second gear to be driven is driven by means of the transmission wheel 34, these gears 24 and 26 to be driven will thus, like the rotors 16 and 18, rotate in different directions of rotation.

The rotating motion of driving shaft 36 of the electrical motor 14 and the driving wheel thereon is in the case shown in FIG. 1 transmitted to the gears 28, 30 on the secondary shaft by means of a transmission wheel 44 at a transmission shaft 42.

Figure 2:
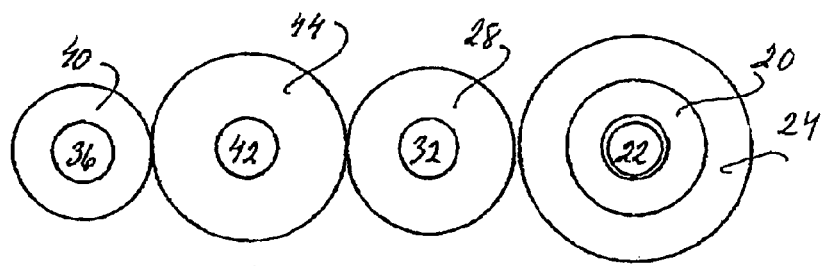
FIG. 2 shows schematically a horizontal cross section at the line AA of the wheel assembly shown in FIG. 1.
Figure 3:
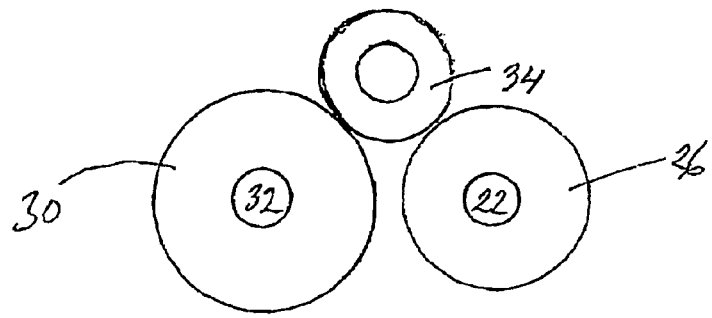
FIG. 3 shows schematically a horizontal cross section at the line BB of the wheel assembly shown in FIG. 1.

FIG. 2 shows that the driving shaft 36 rotated by the electrical motor rotates a driving wheel 40 at said shaft. The driving wheel 40 rotates by means of a transmission shaft 42 the transmission wheel 44, located at the same level, which in turn by means of the secondary shaft 32 rotates the first gear 28, also located at the same level. This first gear 28 rotates the first gear 24 to be driven, which is located also at the same level and at the end of the shaft 20 of the first rotor, and thus also the first rotor 16.

In FIG. 1 one can see that the rotating first gear 28 at the secondary shaft rotates the secondary shaft 32 and the second gear 30 thereon. In FIG. 3 one can see that said second gear 30 rotates the transmission wheel 34 on the same level. The transmission wheel 34 in turn rotates the second gear 26 to be driven, which is located on the same level and at the end of the shaft 22 of the second rotor. Due to the transmission wheel 34 the second gear 26 to be driven rotates in the opposite direction of rotation with respect to the first gear 24 to be driven. In this way two coaxial rotors can be simultaneously rotated in different directions of rotation by means of one single driving apparatus.

If desired, both of the gears 24, 26 to be driven can be driven directly without transmission, in which case both of the gears to be driven will rotate in the same direction. On the other hand, both of the gears 24, 26 to be driven can be driven by means of transmission, in which case both of the gears to be driven also will rotate in the same direction. In these cases the rotors are however arranged to rotate at different speed. By changing the transmissions between the gears 28, 30 on the secondary shaft 32 and the gears 24, 26 to be driven on the shafts of the rotors 20, 22, the gears 24, 26 to be driven can be rotated at speeds desired.

Figure 4:
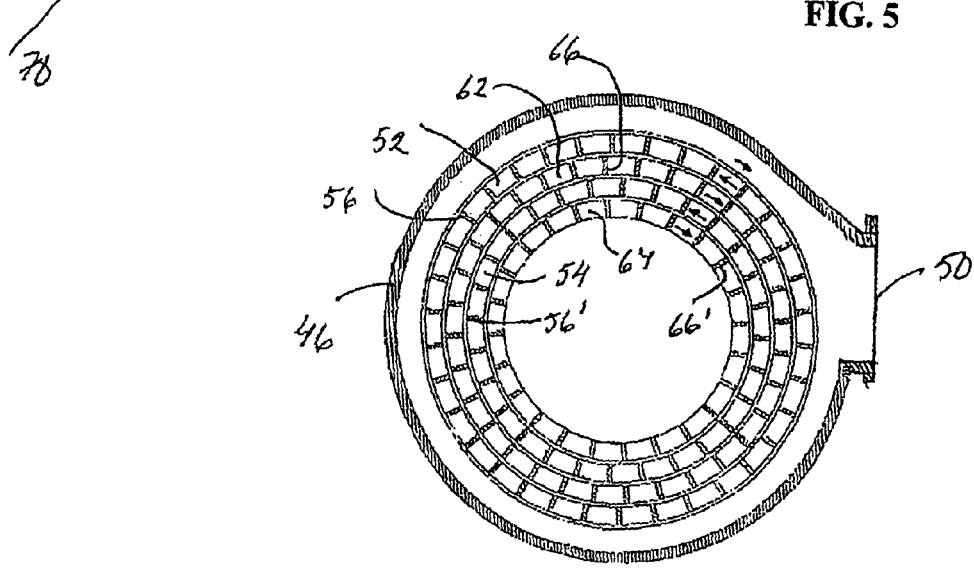
FIG. 4 shows schematically a horizontal cross section at the line CC of the rotor apparatus shown in FIG. 1.

As can be seen in FIGS. 1 and 4, the rotor apparatus 12 is enveloped by a housing 46 having a feeding opening 48 through which the material to be treated and optionally another substance to be added are fed into the apparatus. In the case shown by FIGS. 1 and 4, the housing is further equipped with one discharge opening 50. If desired, there can be several discharge openings; the rotor apparatus may even be open around its entire periphery.

The rotor apparatus shown by FIGS. 1 and 4 comprises two rotors 16 and 18. On the first rotor 16 has been arranged blades 56 and 56' on two rings 52 and 54 which are coaxial with respect to the rotor but which are located at different distances from the pivot axis. The blades are at their first ends fixed to the frame 58 of this rotor. Accordingly, on the second rotor 18 has been arranged blades 66 and 66' on two rings 62 and 64 which are coaxial with respect to the rotors but which are located at different distances from the pivot axis. The blades are at their first ends fixed to the frame 68 of this rotor. The blades 66 on the second rotor have been arranged to run between the rings 52, 54 formed by the blades 56, 56' on the first rotor. The blades 66' on the second rotor have been arranged to run inside the ring 54 formed by the blades 56' on the first rotor. The rings formed by the blades on the different rotors will thus run in an intermeshed fashion with respect to each other. The blades can additionally at their second ends be fixed to ring-specific supporting rings, which are not shown in the figures.

The rotors 16 and 18 which rotate in different directions transport the material to be treated due to the centrifugal force generated by the rotors along a zigzag track towards the outermost ring of the rotors. The material treated exits tangentially from the outermost ring through the discharge opening 50.

The blades 56, 56', 66, 66' have impact surfaced on their front part. The material fed to the rotor apparatus collides first with the impact surfaces of the blades 66', which throw the material clockwise obliquely outwards, wherein the material collides with the impact surfaces of the blades 56' moving in the opposite direction, which throw the material counterclockwise obliquely outwards. The blades 66 throw the material clockwise obliquely outwards and the blades 56 finally throw the material counter-clockwise obliquely outwards into the space surrounding the rings, from which the treated material is discharged through the discharge opening 50.

In the solution according to the invention, the transmission between the driving apparatus 14 and the rotor apparatus 12 has been arranged by transmission machinery with a gearbox, where elements rotating in opposite directions or in the same direction but with different speed is new.

In the case shown by FIGS. 1 to 4 the transmission from the electrical motor to the secondary shaft equipped with a gear pair is carried out by means of gears. The rotating motion of the driving shaft of the electrical motor or the like can according to the invention alternatively be transmitted to the secondary shaft by other means, for example by belt transmission apparatuses.

Figure 5:
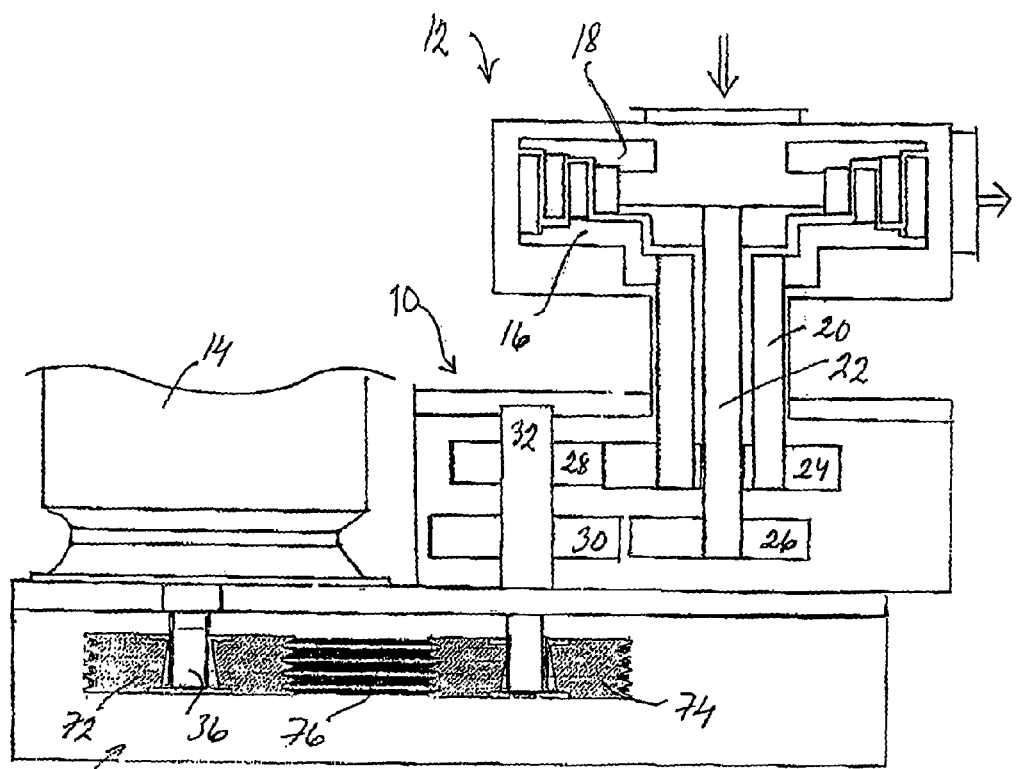
FIG. 5 shows schematically a vertical cross section of the transmission machinery between the driving apparatus and the rotor apparatus according to another embodiment.

FIG. 5 shows another example according to the invention of transmission machinery 10, located between the electrical motor 14 and the rotor apparatus 12. Also in this case the shafts 20, 22, arranged inside each other, of the coaxial rotors 16, 18 are rotated by means of a gear pair 28, 30 arranged on the secondary shaft 32. However, in the case shown by FIG. 5, the rotating motion of the driving shaft 36 of the electrical motor is transmitted to the secondary shaft 32 by means of a belt transmission apparatus 70. When the belt transmission apparatus is used, a wheel 72 driving the belt is arranged at the driving shaft 36 of the electrical motor 14. Accordingly, on the secondary shaft 32 equipped with the gear pair, has been arranged a wheel 74 to be driven, i.e. a wheel driven by the belt 76. The belt 76 may for example be one single cogged belt, or it may be made of several vee belts as shown in the case disclosed by FIG. 5. The wheel 74 driven by the belt rotates the secondary shaft 32 and causes thus rotation of the gears 28, 30. The transmission between the gears 28, 30 on the secondary shaft 32 and the gears 24, 26 on the shafts 20, 22 of the rotors is in the case shown by FIG. 5 arranged as in the case shown by FIG. 1.

In the case shown by FIG. 1 the shafts of both of the rotors are arranged to extend downwards from the rotors. This arrangement is suitable for use for example in apparatuses, where the rotor apparatus is fitted on the bottom of a container and the shafts are arranged to extend outwards from the container through the bottom. In apparatuses where the rotor apparatus is arranged in the upper part of the container, the shafts can correspondingly be arranged to extend upwards from the rotors. The feeding can be arranged from down into the feeding opening of the rotor apparatus by means of a separate feeding pipe or the like. In some cases the feeding can be arranged through a channel formed into the inner shaft. If desired, the rotor apparatus can be arranged to rotate in a vertical position or an inclined position, for example by fitting it to the wall of the container. In this case the shafts of the rotors will accordingly become horizontal or inclined. The transmission machinery will be suitably arranged between the shafts of the driving apparatus and the rotors, as the case may be, in a manner required by their position.

Figure 6:
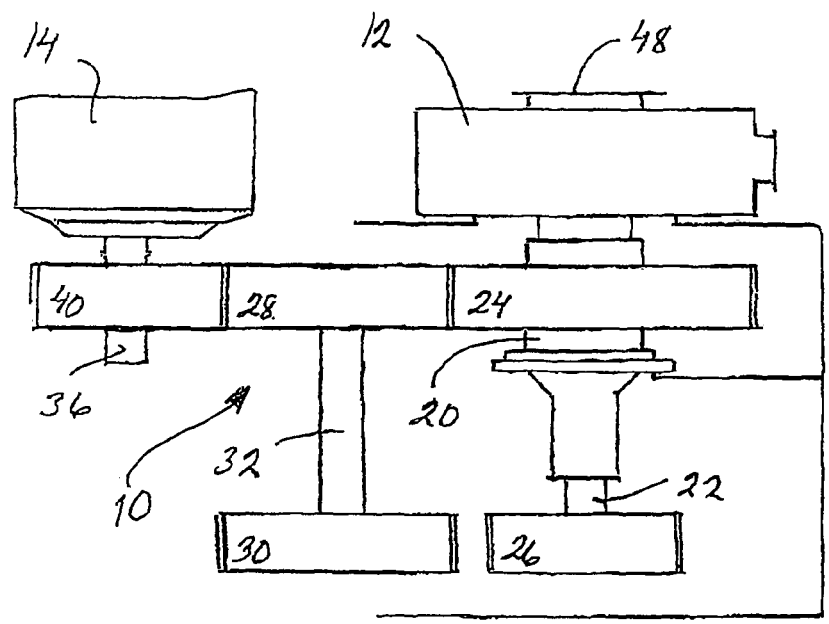
FIG. 6 shows schematically a vertical view of the transmission machinery between the driving apparatus and the rotor apparatus according to a third embodiment.

In the case shown by FIG. 1 the transmission from the driving shaft 36 to the secondary shaft is carried out by a transmission wheel 44 on a transmission shaft 42. The transmission shaft and the transmission wheel are not always necessary. FIG. 6 shows schematically a case where no transmission shaft is used. The driving wheel 40 at the driving shaft 36 of the electrical motor 14 rotates directly the gear 28, in this case the upper gear, on the secondary shaft 32, which gear in turn according to FIG. 1 rotates the gear 24 on the outer shaft 20. The lower gear 30 on the secondary shaft 32 rotates correspondingly by use of a transmission wheel, as shown in FIGS. 1 and 3, the gear 26 on the inner shaft 22. In this way the driving apparatus 14 and the rotor apparatus 12 come close to each other and the whole apparatus will become very compact.

The apparatus can be made even more compact by using the driving shaft 36a of the driving apparatus directly as secondary shaft. In this case two gears 40*a* and 40*b* are arranged on the driving shaft. Said gears drive according to FIGS. 1-3, the shafts 20, 22 of the rotors. When the driving wheel 40 on the driving shaft 36 and the transmission wheel 44 on the transmission shaft 42, shown in FIG. 1, are eliminated, the driving apparatus 14 and the rotor apparatus 12 move closer to each other, whereby the use of this arrangement will become restricted. For example in the case shown by FIG. 6 the driving apparatus does not fit above the secondary shaft.

Figure 7:
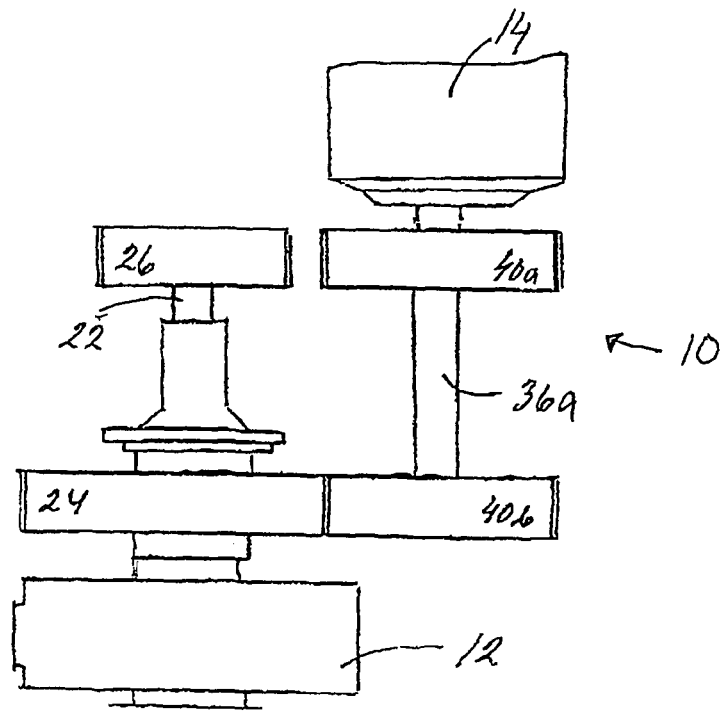
FIG. 7 shows schematically a vertical view of the transmission machinery between the driving apparatus and the rotor apparatus according to a fourth embodiment.

The driving shaft of the driving apparatus can very well be used as secondary shaft in the case shown by FIG. 7, where the driving apparatus 14 and the rotor apparatus 12 are arranged on different sides of the transmission machinery. In FIG. 7, on the shaft 36*a* of the driving apparatus, which shaft operates as secondary shaft, are arranged two gears, an upper gear 40*a* and a lower gear 40*b*. The lower gear 40*b* drives directly the gear 24 to be driven, located on the outer shaft 20 of the rotor apparatus. Correspondingly, the upper gear 40*a* drives the gear 26 to be driven, located on the inner shaft 22, by means of a transmission wheel 34 shown in FIG. 34. The real rotor apparatus is arranged on the lower end of the shafts of the rotors. The construction will thus become tower-like, i.e. thinner and higher than the construction shown in FIG. 6. This tower-like construction in which the rotor apparatus extends freely outwards can be used in many applications, as disclosed in FIG. 8.

Figure 8:
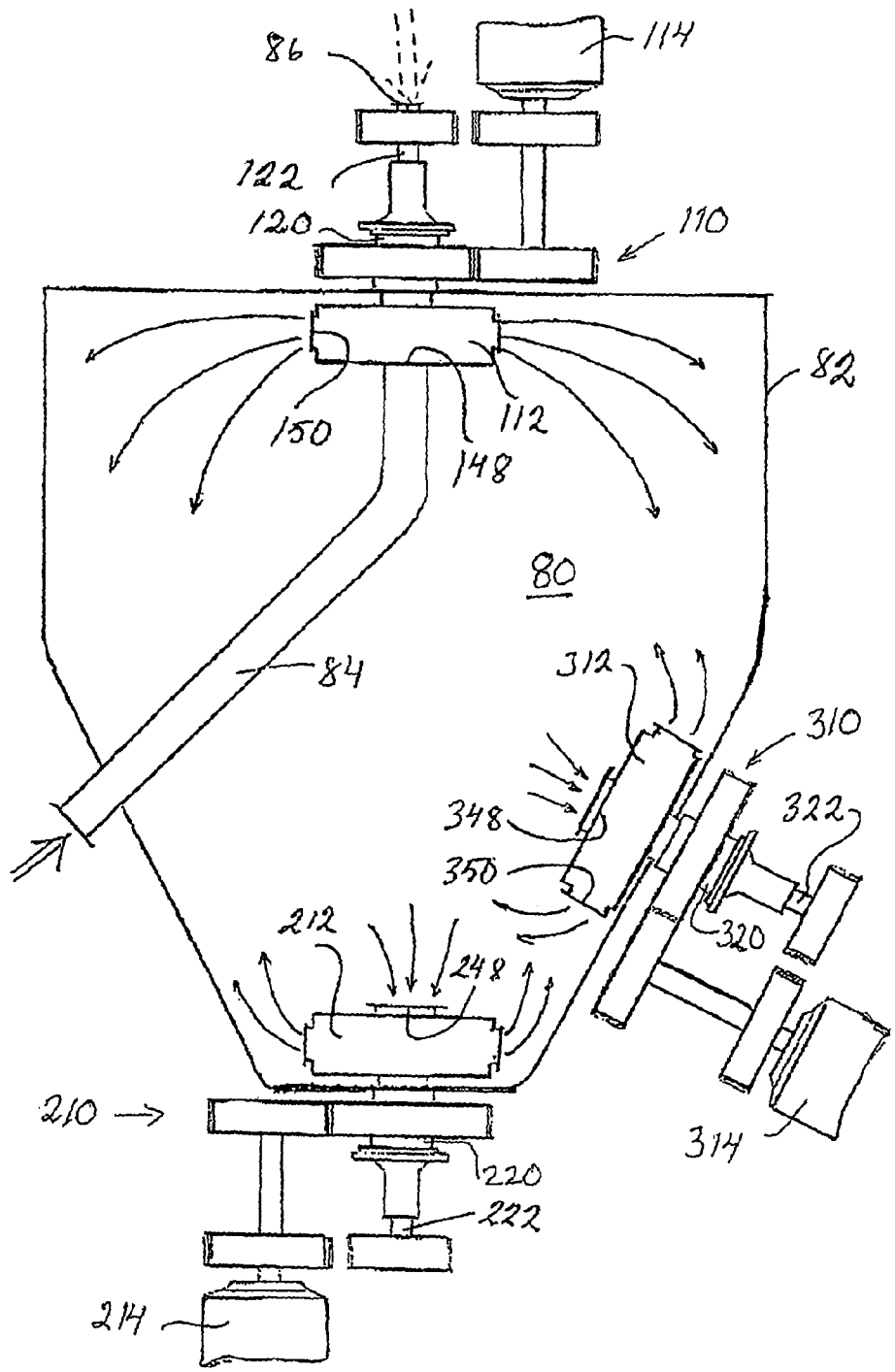
FIG. 8 shows schematically different alternatives for arranging the rotor apparatus based on the invention into a housing.

FIG. 8 shows a container 80, into which, for example, three rotor apparatuses 112, 212 and 312, connected to transmission machinery 110, 210, 310, have been arranged. The real rotor apparatuses 112, 212, 312 are arranged inside the container and the transmission apparatuses 110, 210, 310, which are connected to driving apparatuses 114, 214, 314, are arranged outside the container. The shafts 120, 220, 320 and 122, 222, 322 of the rotors extend through the wall 82 of the container.

The rotor apparatus 112 is arranged in the roof of the container. It is normally easy to fit the transmission machinery 110 and the driving apparatus 114 above the container. The rotor apparatus 112 has in this case an open periphery so that the discharge opening 150 encompasses the whole periphery, or so that there are several discharge openings 150 at different positions of the periphery. The feeding to the rotor apparatus is carried out through the pipe 84 to the feeding opening 148 of the rotor apparatus. Alternatively, the feeding can be made through a feeding opening 86 and feeding channel formed in the inner shaft 122.

On the other hand, as also shown in FIG. 8, the rotor apparatus 212 can be fitted on the bottom of the container 80. The feeding can be made through the inner rotor shaft 222, or (not shown) through a pipe like the feeding to the rotor apparatus 112 in the upper part.

The rotor apparatus 312 can on the other hand, as also shown in FIG. 8, be arranged on an inclined wall of the container. The rotor apparatus 312 can be used to treat the material inside the container. A feeding opening 348 to the container is located in the centre of the rotor apparatus 312. The motion of the rotors forces the material to flow through the rotor apparatus. The material flows in through the feeding opening, moves along a zigzag track through the rings of the rotors and exits from the apparatus through the discharge openings 350 along the periphery.

Above are presented only a few transmission arrangements used in the invention. In the apparatuses shown, only gears with straight cogs are used in the transmission arrangements. In the applications according to the invention, some or all of the straight-cogged gears, such driving gears, secondary gears, transmission gears or gears to be driven, can if desired, be replaced by conic gears, whereupon the geometry of the arrangement will change.

Figure 9:
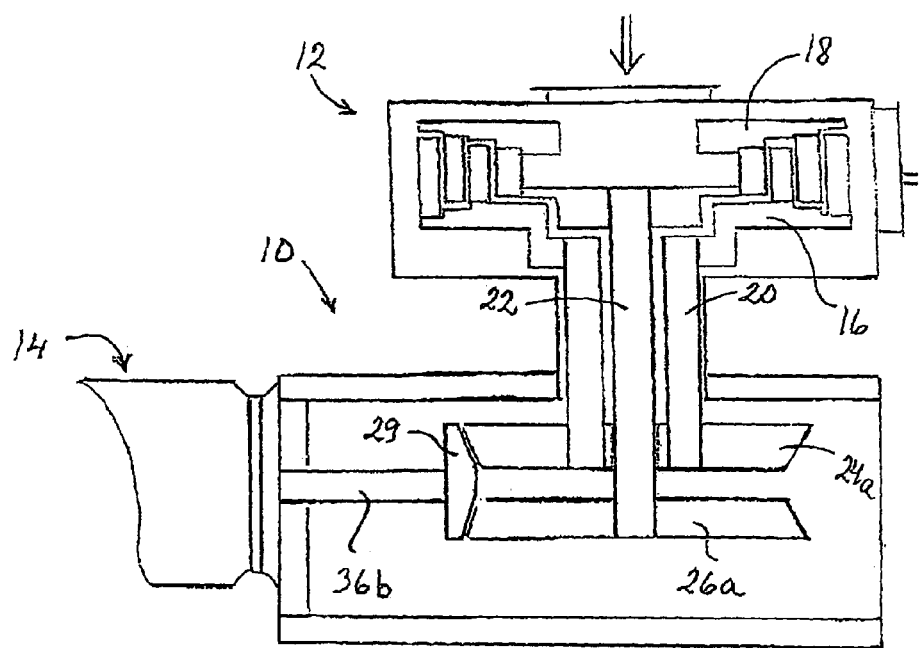
FIG. 9 shows schematically and simplified a vertical cross section of the transmission machinery between the driving apparatus and the rotor apparatus according to a fifth embodiment.

FIG. 9 shows the transmission machinery 10 according to FIG. 1 where conic gears have bee used instead of straight-cogged gears. The transmission machinery is arranged between the rotor apparatus 12 operating according to the impact mill principle and the driving apparatus 14. The rotor apparatus 12 operating according to the impact mill principle comprises two coaxial, in opposite directions rotating rotors, the first rotor 16 and the second rotor 18. The shafts 20, 22 of the rotors are vertical. The shaft 22 of the second rotor is arranged inside the shaft 20 of the first rotor.

At the lower end of the shafts 20, 22 of the rotors 16, 18 have been fitted wheels, which in this case are conic gears. At the lower end of the first shaft 20 has been fitted a first conic gear 24*a* and at the lower end of the second shaft 22 a second conic gear 26*a*.

The driving shaft of the driving apparatus 14 operates in this case as the secondary shaft 36*b*. The driving apparatus has been arranged in such a position that the secondary shaft is horizontal. A conic gear 29 is fitted on the secondary shaft 36*b*. The conic gears 24*a* and 26*a* at the rotor shafts are, as shown by FIG. 9, both connected to the conic gear 29 on the secondary shaft 36*b*, one to the upper end of the conic gear 29 and the other to the lower end of the conic gear in a manner known as such. In this way the conic gears will rotate in opposite directions of rotation. In this case there is no need for a separate transmission wheel to change the direction of rotation of the second gear.

In the case shown by FIG. 9 it is possible if needed, as in the case shown by FIG. 1, to use different transmission gears in order to change the geometry of the transmission machinery. Transmission apparatuses can be added in order to achieve a desired geometry.

In corresponding rotor apparatuses, transmission to rotors rotating in opposite direction has earlier been carried out by two electrical motors. To the first rotor is arranged a vee belt drive from the first electrical motor, which is located below the rotors. To the second rotor is arranged a vee belt drive from the second electrical motor, which is located above the rotors. Separate driving apparatuses with transmission elements have thus been used to rotate each rotor of the rotor apparatus. Now it has surprisingly been found that one single driving apparatus can be used to rotate two coaxial rotors in different directions or with different speed. Thus many important advantages can be achieved.

By using the transmission machinery described above, which makes it possible to rotate the two rotors of the rotor apparatus with one single driving apparatus, many remarkable advantages are achieved, compared to earlier practice:

A cheaper and smaller construction is achieved.

Also cabling, seals, bearings and lubrication are more favourable.

Standard equipment can be used in the transmission machinery.

The effect and the rotation speeds can be increased.

The machinery can be made pressure-proof easier that before.

The entry of oil into the treated material can easily be prevented.

The invention is not intended to be limited to the exemplified embodiments presented above. On the contrary, the invention shall be broadly interpreted within the scope of the claims presented below.

The invention claimed is:

1. An impact mill, comprising
a driving apparatus,
a rotor apparatus comprising two coaxial rotors with shafts wherein
a first rotor is equipped with blades having impact surfaces and which blades form one or more rings coaxial with said first rotor, wherein said rings are located at different distances from a rotational axis of said rotor,
a second rotor is equipped with blades having impact surfaces and which blades form one or more rings coaxial with said second rotor, wherein said rings are located at different distances from a rotational axis of said rotor, and
the rings of the first and second rotor are arranged in an intermeshed fashion,
wherein the shaft of the second rotor is fitted inside the shaft of the first rotor,
wherein the impact mill further comprises transmission machinery arranged to distribute rotating motion generated by the driving apparatus to the shafts of both of the rotors to rotate the same, said transmission machinery comprising
a secondary shaft equipped with a conic gear, wherein said secondary shaft is driven by the driving apparatus directly, and wherein the conic gear at said secondary shaft is arranged to rotate a conic gear at the shaft of the first rotor in one direction and the conic gear at the shaft of the second rotor in an opposite direction of rotation, and
wherein said driving apparatus is a single motor.

2. The impact mill of claim 1, wherein the first and the second rotors are arranged in a housing.

3. The impact mill of claim 1, wherein the shafts of the rotors extend from the centre of the rotors in the same direction.

4. The impact mill of claim 1, wherein the first rotor is equipped with blades having impact surfaces, and which blades form at least two rings coaxial with said rotor, and the second rotor is equipped with blades having impact surfaces and which blades form at least two rings coaxial with said rotor.

* * * * *